US011285557B2

(12) United States Patent
Mehlman et al.

(10) Patent No.: US 11,285,557 B2
(45) Date of Patent: *Mar. 29, 2022

(54) DUAL WIRE WELDING OR ADDITIVE MANUFACTURING SYSTEM

(71) Applicant: Lincoln Global, Inc., Santa Fe Springs, CA (US)

(72) Inventors: Alexander C. Mehlman, Strongsville, OH (US); Todd E. Kooken, Solon, OH (US); Steven R. Peters, Huntsburg, OH (US); Matthew A. Weeks, Walloon (AU); Bruce J. Chantry, Solon, OH (US); Bradford W. Petot, South Euclid, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 125 days.

This patent is subject to a terminal disclaimer.

(21) Appl. No.: 16/267,529

(22) Filed: Feb. 5, 2019

(65) Prior Publication Data

US 2020/0246891 A1    Aug. 6, 2020

(51) Int. Cl.
  B23K 9/04    (2006.01)
  B23K 9/23    (2006.01)
  (Continued)

(52) U.S. Cl.
  CPC .................. B23K 9/04 (2013.01); B23K 9/23 (2013.01); B23K 35/3066 (2013.01); B23H 1/02 (2013.01);
  (Continued)

(58) Field of Classification Search
  CPC .. B23K 9/12; B23K 9/121; B23K 9/122–123; B23K 9/125; B23K 9/133;
  (Continued)

(56) References Cited

U.S. PATENT DOCUMENTS 1,368,287 A    2/1921 Pennington et al.
1,605,860 A    11/1926 Snelling
(Continued)

FOREIGN PATENT DOCUMENTS

CN    2683302 Y    3/2005
CN    101745726 A    6/2010
(Continued)

OTHER PUBLICATIONS

Extended European Search Report from Corresponding Application No. 19203369.4; dated Jul. 31, 2020; pp. 1-8.

(Continued)

*Primary Examiner* — Tu B Hoang
*Assistant Examiner* — Bonita Khlok
(74) *Attorney, Agent, or Firm* — Brad C. Spencer

(57) ABSTRACT

A welding or additive manufacturing wire drive system includes a first drive roll and a second drive roll. One or both of the drive rolls has a circumferential groove for simultaneously driving both of a first wire electrode and a second wire electrode located between the drive rolls in the circumferential groove. A sensor device generates a signal or data corresponding to a consumed or remaining amount of one or both of the wire electrodes. The first wire electrode contacts the second wire electrode within the circumferential groove. The first wire electrode further contacts a first sidewall portion of the circumferential groove. The second wire electrode further contacts a second sidewall portion of the circumferential groove. Both of the wire electrodes are offset from a base portion of the circumferential groove, said base portion extending between the first sidewall portion and the second sidewall portion of the circumferential groove.

6 Claims, 13 Drawing Sheets

(51) Int. Cl.
*B23K 35/30* (2006.01)
*B23K 103/18* (2006.01)
*B23K 103/04* (2006.01)
*B23H 1/02* (2006.01)

(52) U.S. Cl.
CPC ...... *B23K 2103/04* (2018.08); *B23K 2103/18* (2018.08)

(58) Field of Classification Search
CPC .......... B23K 9/1336; B23K 9/04; B23K 9/23; B23K 9/0017; B23K 35/3066; B23K 35/3053; B23K 2103/18; B23K 2103/04; B23K 3/063; B23H 1/02; B23H 1/04; B23H 7/26–32
USPC ........................ 219/69.17, 61.6, 69.15, 69.16
See application file for complete search history.

(56) References Cited

U.S. PATENT DOCUMENTS

| | | |
|---|---|---|
| 2,583,507 A | 1/1952 | Carpenter et al. |
| 2,594,333 A | 4/1952 | Medicus |
| 2,756,311 A | 7/1956 | Persson et al. |
| 2,849,593 A | 8/1958 | Volff et al. |
| 2,866,079 A | 12/1958 | Morley |
| 2,911,517 A | 11/1959 | Armstrong |
| 2,957,101 A | 10/1960 | Barkley |
| 3,131,325 A | 4/1964 | Briggs |
| 3,274,371 A | 9/1966 | Saenger, Jr. |
| 3,328,556 A | 6/1967 | Nelson |
| 3,384,778 A | 5/1968 | Jeannette |
| 3,624,345 A | 11/1971 | Armstrong |
| 3,693,858 A | 9/1972 | Araya |
| 3,694,620 A | 9/1972 | Gleason |
| 3,746,833 A | 7/1973 | Ujiie |
| 3,933,533 A | 1/1976 | Uchida |
| 4,012,621 A | 3/1977 | Uchida |
| 4,088,866 A | 5/1978 | Lund et al. |
| 4,182,947 A | 1/1980 | Brower |
| 4,295,746 A | 10/1981 | Hartmann |
| 4,336,441 A | 6/1982 | Godai |
| 4,437,906 A | 3/1984 | Tateishi |
| 4,475,993 A | 10/1984 | Inoue |
| 4,541,616 A | 9/1985 | Dean |
| 4,697,791 A | 10/1987 | Henderson et al. |
| 4,743,731 A | 5/1988 | Seuring |
| 4,902,873 A | 2/1990 | Ivannikov |
| 4,968,867 A | 11/1990 | Banzai |
| 5,148,001 A | 9/1992 | Stava |
| 5,324,552 A | 6/1994 | Opower |
| 5,440,100 A | 8/1995 | Stuart et al. |
| 5,491,321 A | 2/1996 | Stuart |
| 5,714,735 A | 2/1998 | Offer |
| 5,782,987 A | 7/1998 | Furman |
| 5,791,560 A | 8/1998 | Rogers et al. |
| 5,816,466 A * | 10/1998 | Seufer ................ B23K 9/1333 226/187 |
| 5,958,261 A | 9/1999 | Offer |
| 5,977,504 A | 11/1999 | Offer |
| 5,981,906 A | 11/1999 | Parker |
| 6,012,664 A | 1/2000 | Duclos et al. |
| 6,225,589 B1 | 5/2001 | Bartok |
| 6,172,333 B1 | 9/2001 | Stava |
| 6,355,091 B1 | 3/2002 | Felber et al. |
| 6,374,655 B1 | 4/2002 | Hresc |
| 6,512,200 B2 | 1/2003 | Norrish et al. |
| 6,512,220 B1 | 1/2003 | Park |
| 6,627,839 B1 | 9/2003 | Luckowski |
| 6,683,279 B1 | 1/2004 | Moerke |
| 6,737,616 B1 | 5/2004 | Sherrill |
| 7,032,814 B2 | 4/2006 | Blankenship |
| 7,112,759 B1 | 9/2006 | Severance, Jr. |
| 7,183,516 B2 | 2/2007 | Blankenship |
| 7,233,241 B2 | 6/2007 | Overhultz et al. |
| 7,429,716 B2 | 9/2008 | Bong et al. |
| 7,495,192 B2 | 2/2009 | Takahashi |
| 7,525,067 B2 | 4/2009 | Diez |
| 7,645,960 B2 | 1/2010 | Stava |
| 7,705,269 B2 | 4/2010 | Daniel |
| 7,761,336 B1 | 7/2010 | Blankenship et al. |
| 7,777,447 B2 | 8/2010 | Vogel |
| 8,049,139 B2 | 11/2011 | Houston |
| 8,278,599 B2 | 10/2012 | Patterson |
| 8,569,653 B2 | 10/2013 | Enyedy |
| 8,662,003 B1 | 3/2014 | Cooper et al. |
| 8,723,082 B2 | 5/2014 | Spiesberger |
| 9,186,745 B2 | 11/2015 | Jia et al. |
| 9,548,683 B2 | 1/2017 | Fukuda et al. |
| 9,713,852 B2 | 7/2017 | Becker et al. |
| 9,839,970 B2 | 12/2017 | Peters et al. |
| 9,855,679 B2 | 1/2018 | Batchelder et al. |
| 9,862,056 B2 | 1/2018 | Berger et al. |
| 9,937,577 B2 | 4/2018 | Daniel et al. |
| 9,937,578 B2 | 4/2018 | Becker et al. |
| 10,010,962 B1 | 7/2018 | Gelmetti et al. |
| 10,792,752 B2 | 10/2020 | Weeks et al. |
| 2001/0008235 A1 | 7/2001 | Miszczak et al. |
| 2003/0209530 A1 | 11/2003 | Stuart et al. |
| 2005/0218132 A1 | 10/2005 | Wells |
| 2005/0224486 A1 | 10/2005 | Matiash |
| 2005/0230373 A1 | 10/2005 | Kensrue |
| 2006/0070985 A1 | 4/2006 | Nakabayashi et al. |
| 2006/0081675 A1 * | 4/2006 | Enyedy ................ B23K 9/1336 226/181 |
| 2006/0243704 A1 | 11/2006 | Matz et al. |
| 2007/0145028 A1 | 6/2007 | Artelsmair |
| 2007/0158324 A1 | 7/2007 | O'Donnell et al. |
| 2007/0164074 A1 | 7/2007 | Schorghuber et al. |
| 2008/0169336 A1 | 7/2008 | Spiegel et al. |
| 2008/0190900 A1 | 8/2008 | Zhang et al. |
| 2009/0050609 A1 | 2/2009 | Berger et al. |
| 2009/0234483 A1 | 9/2009 | Leko et al. |
| 2010/0213179 A1 | 8/2010 | Peters |
| 2010/0301030 A1 | 12/2010 | Zhang et al. |
| 2010/0314373 A1 | 12/2010 | Patterson |
| 2011/0171393 A1 | 7/2011 | Margolies et al. |
| 2011/0309062 A1 | 12/2011 | O'Donnell et al. |
| 2012/0152921 A1 | 6/2012 | Peters et al. |
| 2012/0285938 A1 * | 11/2012 | McFadden ........... B23K 9/1735 219/130.1 |
| 2013/0264323 A1 | 10/2013 | Daniel |
| 2014/0027413 A1 | 1/2014 | Lin et al. |
| 2014/0166633 A1 | 6/2014 | Albrecht |
| 2015/0209905 A1 | 7/2015 | Matthews et al. |
| 2016/0228972 A1 | 8/2016 | Jogdand et al. |
| 2016/0267806 A1 | 9/2016 | Hsu et al. |
| 2016/0331592 A1 | 11/2016 | Stewart |
| 2017/0080511 A1 | 3/2017 | Jaeger et al. |
| 2017/0165776 A1 | 6/2017 | Becker et al. |
| 2017/0165779 A1 | 6/2017 | Barhorst et al. |
| 2018/0126476 A1 | 5/2018 | Meess et al. |
| 2018/0207744 A1 * | 7/2018 | Stoecker .............. B23K 9/1333 |
| 2018/0214972 A1 | 8/2018 | Jansma et al. |
| 2018/0214973 A1 | 8/2018 | Jansma et al. |
| 2018/0281097 A1 | 10/2018 | Jansma |
| 2019/0168334 A1 | 6/2019 | Kooken et al. |
| 2019/0201997 A1 | 7/2019 | Stergios et al. |

FOREIGN PATENT DOCUMENTS

| | | |
|---|---|---|
| CN | 102615398 A | 8/2012 |
| CN | 102430846 B | 5/2013 |
| CN | 103071899 A | 5/2013 |
| CN | 103170713 A | 6/2013 |
| CN | 103648702 A | 3/2014 |
| CN | 101712095 B | 9/2014 |
| CN | 104334305 A | 2/2015 |
| CN | 104439623 A | 3/2015 |
| CN | 204339099 U | 5/2015 |
| CN | 205464747 U | 8/2016 |
| CN | 105983742 A | 10/2016 |
| CN | 106270978 A | 1/2017 |
| CN | 104972205 B | 4/2017 |

(56) References Cited

FOREIGN PATENT DOCUMENTS

| | | |
|---|---|---|
| CN | 106670630 A | 5/2017 |
| CN | 106735769 A | 5/2017 |
| CN | 206241445 U | 6/2017 |
| CN | 206578445 U | 10/2017 |
| CN | 109382566 A | 2/2019 |
| DE | 1115 382 B | 10/1961 |
| DE | 2 108 614 A1 | 10/1971 |
| DE | 44 20 706 A1 | 12/1995 |
| DE | 196 11 583 A1 | 9/1997 |
| DE | 196 11 597 A1 | 9/1997 |
| DE | 298 19 828 U1 | 11/1999 |
| DE | 10 2008 014915 A1 | 11/2009 |
| DE | 10 2009 040 882 A1 | 4/2011 |
| DE | 10 2016 003468 A1 | 9/2016 |
| DE | 10 2015 122135 A1 | 6/2017 |
| EP | 1707296 A1 | 10/2006 |
| EP | 1 294 522 B1 | 9/2007 |
| EP | 3446821 A1 | 2/2019 |
| EP | 3 656 497 A2 | 5/2020 |
| EP | 3 696 116 A1 | 8/2020 |
| GB | 990208 A | 4/1965 |
| GB | 1 502 288 A | 3/1978 |
| GB | 2 058 637 A | 4/1981 |
| JP | S51-44542 A | 4/1976 |
| JP | S60-15360 A | 1/1985 |
| JP | H02-258168 A | 10/1990 |
| JP | 02-280968 A | 11/1990 |
| JP | 04053617 B | 8/1992 |
| JP | H05-111769 A | 5/1993 |
| JP | H10-58142 A | 3/1998 |
| JP | H10-113771 A | 5/1998 |
| JP | 3739870 B2 | 1/2006 |
| JP | 2008-055506 A | 3/2008 |
| JP | 2008-087045 A | 4/2008 |
| JP | 2010-069494 A | 4/2010 |
| JP | 2010-082624 A | 4/2010 |
| JP | 5133079 B2 | 1/2013 |
| JP | 5157006 B2 | 3/2013 |
| JP | 5580869 B2 | 8/2014 |
| JP | 6137053 B2 | 5/2017 |
| JP | 2017-177125 A | 10/2017 |
| KR | 2001-0002945 A | 1/2001 |
| KR | 10-0837103 B1 | 6/2008 |
| KR | 10-2010-0115997 A | 10/2010 |
| KR | 200455348 Y1 | 8/2011 |
| KR | 10-1277451 B1 | 6/2013 |
| KR | 10-1412374 B1 | 6/2014 |
| SU | 1237347 A1 | 6/1986 |
| WO | 1997045227 A1 | 12/1997 |
| WO | 2010/080411 A1 | 7/2010 |
| WO | 2012/153177 A1 | 11/2012 |

OTHER PUBLICATIONS

Extended European Search Report from Corresponding Application No. EP19203389.2; dated Jun. 22, 2020; pp. 1-9.

Shi, et al.; "Physical Characteristics of Twin-Wire Indirect Arc Plasma;" Vacuum; vol. 107; dated Apr. 3, 2014; pp. 41-50.

Extended European Search Report from Corresponding Application No. 19205296.7; dated Aug. 13, 2020; pp. 1-13.

Extended European Search Report from Corresponding Application No. 19205356.9; dated Aug. 13, 2020; pp. 1-9.

Wolf Robotics; "Tandem Wire MIG Welding"; dated Aug. 29, 2007; pp. 1-8.

Leng, et al.; "The characteristic of twin-electrode TIG coupling arc pressure"; Journal of Physics D: Applied Physics vol. 39(6):1120; Dated Mar. 3, 2006.

D/F Machine Specialties; "D/F Automatic & Robotic MIG Tandem Torch"; https://www.dfmachinespecialties.com/index.php?option=com_content&view=article&id=35; Accessed on Oct. 15, 2018; pp. 1-4.

Ye, et al.; "Research on arc interference and welding operating point change of twin wire MIG welding"; The International Journal of Advanced Manufacturing Technology; vol. 89, Issue 1-4; Dated Mar. 2017; pp. 493-502.

Ueyama, et al.; "Effects of torch configuration and welding current on weld bead formation in high speed tandem pulsed gas metal arc welding of steel sheets"; Science and Technology of Welding and Joining; vol. 10, No. 6; Dated 2005; Published Online Dec. 4, 2013; pp. 750-759.

Fronius; "CMT Twin"; https://www.fronius.com/en/welding-technology/products/robotic-welding/migmag-high-performance/cmt-twin/cmt-twin; Accessed on Oct. 15, 2018; pp. 1-5.

SKS Welding Systems; "Dual Wire 2.0 for double-speed welding"; https://www.sks-welding.com/en/torch-systems/dual-wire/dual-wire-20/product.html; Accessed on Oct. 15, 2018; pp. 1-2.

Lincoln Electric; "Tandem MIG™ 800 Amp Welding Torch"; https://www.lincolnelectric.com/assets/US/EN/literature/E10601.pdf; Accessed on Oct. 15, 2018; pp. 1-4.

Wire Wizard; "Weld Cell Monitoring and Optimization System"; https://www.wire-wizard.com/ELCoCatalog_web.pdf; Accessed on Oct. 17, 2018; p. 42.

Lincoln Electric; "Wire Level Gauge"; https://www.lincolnelectric.com/assets/US/en/literature/mc0995.pdf Accessed on Oct. 17, 2018; p. 6.

Miller; Auto-Continuum 350 and 500 w/ Insight Core User Manual; https://www.millerwelds.com/files/owners-manuals/O273473D_MIL.pdf; Dated Nov. 2016; Section 8, pp. 40-43.

Kemppi; "ArcFeed 200, 300, 300P, 300RC Operating Manual"; https://resources.userdoc.kemppi.com/manuals/kemppi-arcfeed-om-en.pdf; Accessed Jul. 5, 2018; pp. 1-20.

Castolin Eutectic; "CastoMIG 350C and OS"; hllps://ecitydoc.com/download/strongerwith-castolin-eutectic-welding-equipment-catalogue_pdf; Dated Jan. 29, 2018; pp. 1-52.

Misumi; "Guide Roller (V Type, Single Bearing) (GRL-SH1-V)"; hllps://my.misumi-ec.com/vona2/detail/221000383638/?CategorySpec=00000196577%3a%3ad; Accessed Jul. 5, 2018; pp. 1-5.

EWM AG; "MIG/MAG Primer"; Dated Nov. 2015; p. 94.

Extended European Search Report from Corresponding Application No. 18187717.6; dated Jan. 4, 2019; pp. 1-10.

EWM Group; "PM Welding Torch with Display—They Hold the Promise of EWM;" https:/iwww.ewm-group/en/products/new-products/pm-brermer.html? sm_au_: :NV; Dated Sep. 20, 2018; pp. 1-7.

Yield Management Corporation; "Low Spool Detection for Extruder Payoffs;" Dated May 15, 2018; pp. 1-2.

Extended European Search Report for Corresponding Application No. 21156359.8; dated Jul. 9, 2021; pp. 1-8.

Extended European Search Report for Corresponding Application No. 21153533.1; dated Jul. 20, 2021; pp. 1-9.

* cited by examiner

DUAL WIRE WELDING OR ADDITIVE MANUFACTURING SYSTEM

BACKGROUND OF THE INVENTION

Field of the Invention

Devices, systems, and methods consistent with the invention relate to material deposition with a dual wire configuration.

Description of Related Art

When welding, it is often desirable to increase the width of the weld bead or increase the length of the weld puddle during welding. There can be many different reasons for this desire, which are well known in the welding industry. For example, it may be desirable to elongate the weld puddle to keep the weld and filler metals molten for a longer period of time so as to reduce porosity. That is, if the weld puddle is molten for a longer period of time there is more time for harmful gases to escape the weld bead before the bead solidifies. Further, it may be desirable to increase the width of a weld bead so as to cover wider weld gap or to increase a wire deposition rate. In both cases, it is common to use an increased electrode diameter. The increased diameter will result in both an elongated and widened weld puddle, even though it may be only desired to increase the width or the length of the weld puddle, but not both. However, this is not without its disadvantages. Specifically, because a larger electrode is employed more energy is needed in the welding arc to facilitate proper welding. This increase in energy causes an increase in heat input into the weld and will result in the use of more energy in the welding operation, because of the larger diameter of the electrode used. Further, it may create a weld bead profile or cross-section that is not ideal for certain mechanical applications. Rather than increasing the diameter of the electrode, it may be desirable to use two smaller electrodes simultaneously.

BRIEF SUMMARY OF THE INVENTION

The following summary presents a simplified summary in order to provide a basic understanding of some aspects of the devices, systems and/or methods discussed herein. This summary is not an extensive overview of the devices, systems and/or methods discussed herein. It is not intended to identify critical elements or to delineate the scope of such devices, systems and/or methods. Its sole purpose is to present some concepts in a simplified form as a prelude to the more detailed description that is presented later.

In accordance with one aspect of the present invention, provided is a welding or additive manufacturing wire drive system. The system includes a first drive roll and a second drive roll. One or both of the first drive roll and the second drive roll has a circumferential groove for simultaneously driving both of a first wire electrode and a second wire electrode located between the first drive roll and the second drive roll in the circumferential groove. A sensor device generates a signal or data corresponding to a consumed or remaining amount of one or both of the first wire electrode and the second wire electrode. The first wire electrode contacts the second wire electrode within the circumferential groove. The first wire electrode further contacts a first sidewall portion of the circumferential groove. The second wire electrode further contacts a second sidewall portion of the circumferential groove. Both of the first wire electrode and the second wire electrode are offset from a base portion of the circumferential groove, said base portion extending between the first sidewall portion and the second sidewall portion of the circumferential groove.

In accordance with another aspect of the present invention, provided is a welding or additive manufacturing system. The system includes a first wire electrode source storing a first wire electrode and a second wire electrode source storing a second wire electrode. A welding torch includes a contact tip assembly having a first exit orifice for the first wire electrode and second exit orifice for the second wire electrode. The system includes at least one power supply and a controller which controls operation of the power supply. The power supply provides a current waveform to the contact tip assembly. A sensor device generates a signal or data corresponding to a consumed or remaining amount of one or both of the first wire electrode and the second wire electrode. The first and second exit orifices of the contact tip assembly are separated from each other such that a distance S is provided between the first wire electrode and the second wire electrode. The contact tip assembly is configured to deliver the current waveform to both of the first wire electrode and the second wire electrode. The distance S is configured to facilitate formation of a bridge droplet between the first wire electrode and the second wire electrode by the current waveform, where said bridge droplet couples the first wire electrode and the second wire electrode prior to contacting a molten puddle during a deposition operation.

In accordance with another aspect of the present invention, provided is a welding or additive manufacturing system. The system includes a wire feeder including a first drive roll, a second drive roll, and a biasing member that biases the first drive roll toward the second drive roll. One or both of the first drive roll and the second drive roll has a circumferential groove for simultaneously driving both of a first wire electrode and a second wire electrode located between the first drive roll and the second drive roll in the circumferential groove. A welding torch includes a contact tip having a first exit orifice for the first wire electrode and second exit orifice for the second wire electrode. The first and second exit orifices are separated from each other such that a distance S is provided between the first wire electrode and the second wire electrode, and the distance S is configured to facilitate formation of a bridge droplet between the first wire electrode and the second wire electrode during a deposition operation, where said bridge droplet couples the first wire electrode and the second wire electrode prior to contacting a molten puddle during the deposition operation.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1A:
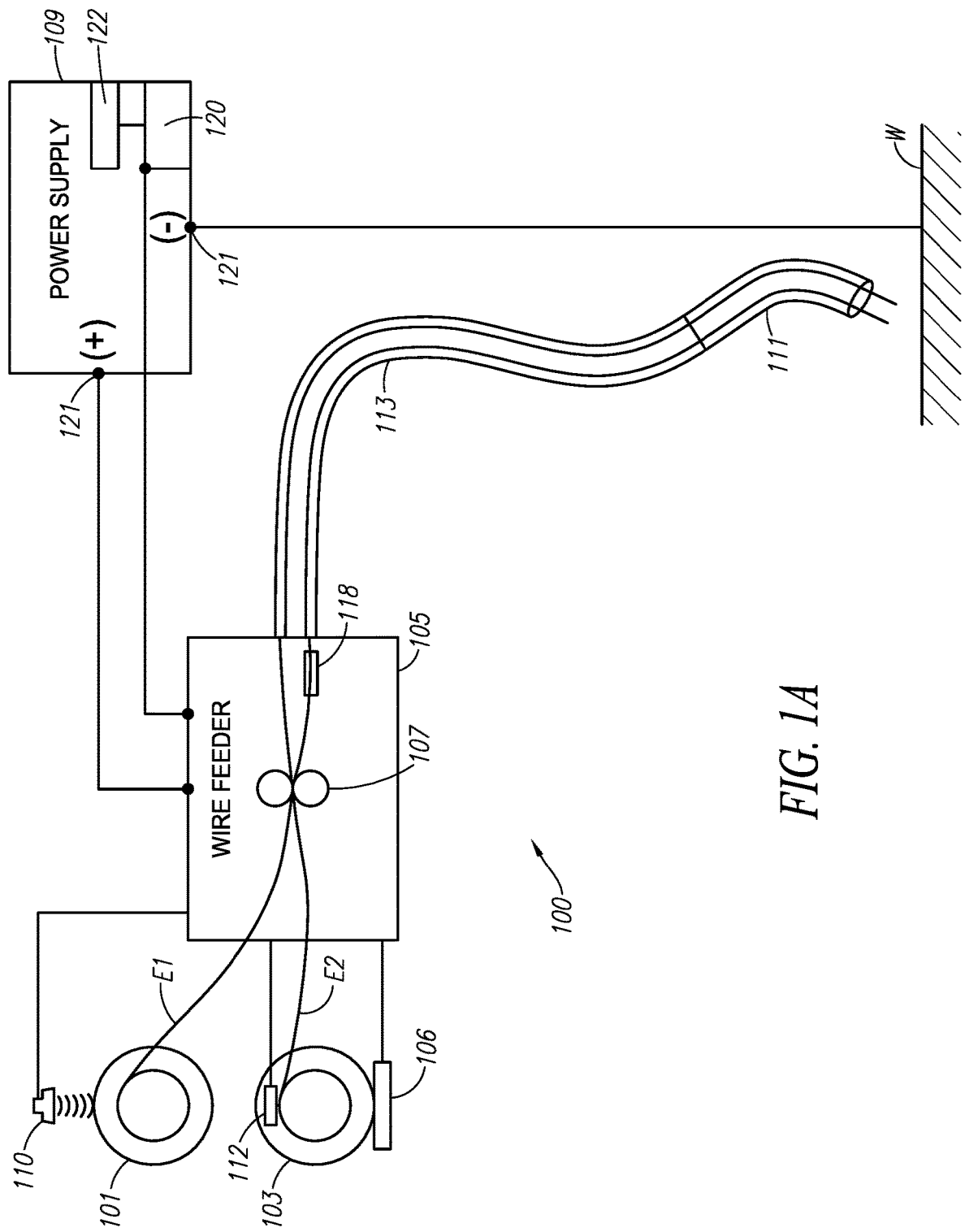
FIG. 1A is a schematic diagram of an example welding system.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. Any disjunctive word or phrase presenting two or more alternative terms, whether in the description of embodiments, claims, or drawings, should be understood to contemplate the possibilities of including one of the terms, either of the terms, or both terms. For example, the phrase "A or B" should be understood to include the possibilities of "A" or "B" or "A and B."

Embodiments of the present invention are described herein in the context of a welding system. Example welding systems include gas metal arc welding (GMAW) systems, submerged arc welding (SAW) systems, flux-cored arc welding (FCAW) systems, metal-cored arc welding (MCAW) systems, and the like. Further, while the electrodes described herein can be solid electrodes, embodiments of the present invention are not limited to the use of solid electrodes. For example, flux-cored electrodes and metal-cored electrodes can also be used without departing from the spirit or scope of the present invention. Further, embodiments of the present invention can also be used in manual, semi-automatic and robotic welding operations. Because such systems are well known, they will not be described in detail herein. In addition to welding operations, embodiments of the present invention can be used in additive manufacturing processes and other welding-type processes involving driven wire electrodes (e.g., hardfacing).

Turning now to the Figures, FIG. 1A depicts an exemplary embodiment of a welding system 100. The welding system 100 contains a power supply 109 which is coupled to both a welding torch 111 and a wire feeder 105. The power supply 109 can be any known type of welding power supply capable of delivering welding current and welding waveforms, for example, pulse spray, STT and/or short arc type welding waveforms. Because the construction, design and operation of such power supplies are well known, they need not be described in detail herein. It is also noted that welding power can be supplied by more than one power supply at the same time—again the operation of such systems are known. The power supply 109 can also include a controller 120 which is coupled to a user interface 122 to allow a user to input control or welding parameters for the welding operation. The controller 120 can have a processor, CPU, memory etc. to be used to control the operation of the welding process and the generation of welding waveforms. The torch 111, which can be constructed similar to known manual, semi-automatic or robotic welding torches and can be of a straight or gooseneck type. The wire feeder 105 draws wire electrodes E1 and E2 from electrode sources 101 and 103, respectively, which can be of any known type, such as reels, spools, containers or the like. The wire feeder 105 employs drive rolls 107 to draw the electrodes or welding wires E1 and E2 and push or pull the electrodes to the torch 111. Details of the drive rolls 107 are discussed further below. The drive rolls 107 and wire feeder 105 are configured for a dual electrode welding operation. That is, they supply both electrodes E1 and E2 simultaneously to the torch 111 for creating an arc and welding the workpiece W. As shown, the wire feeder 105 is operatively connected to the power supply 109 consistent with known configurations of welding operations. Like the power supply 109, the wire feeder 105 can also include a controller to execute the various operations ascribed to the wire feeder.

Once driven by the drive rolls 107, the electrodes E1 and E2 can be passed through a liner 113 to deliver the electrodes E1 and E2 to the torch 111. The liner 113 is appropriately sized to allow for the passage of the electrodes E1 and E2 to the torch 111. For example, for two 0.030 inch diameter electrodes, a standard 0.0625 inch diameter liner 113 (which is typically used for a single 0.0625 inch diameter electrode) can be used with no modification.

In certain embodiments, the wire electrodes E1, E2 can have different diameters. That is, embodiments of the present invention can use an electrode of a first, larger, diameter and an electrode of a second, smaller, diameter. In such an embodiment, it may be possible to more conveniently weld two workpieces of different thicknesses. For example, the larger electrode can be oriented to the larger workpiece while the smaller electrode can be oriented to the smaller workpiece. Further, embodiments of the present invention can be used for many different types of welding operations including, but not limited to, GMAW, SAW, FCAW, and MCAW. Additionally, embodiments of the present invention can be utilized with different electrode types. For example, it is contemplated that a cored electrode (e.g., flux-cored or metal-cored) can be coupled with a non-cored or solid electrode. Further, electrodes of differing compositions can be used to achieve desired weld properties and composition of the final weld bead. Two different, but compatible, consumables can be combined to create a desired weld joint. For example, compatible consumables such as hardfacing wires, stainless wires, nickel alloys and steel wires of different composition can be combined. As one specific example a mild steel wire can be combined with an over-alloyed wire to make a 309 stainless steel composition. This can be advantageous when a single consumable of the type desired does not have desirable weld properties. For example, some consumables for specialized welding provide the desired weld chemistry but are extremely difficult to use and have difficulty providing a satisfactory weld. However, embodiments of the present invention allow for the use of two consumables that are easier to weld with to be combined to create the desired weld chemistry. Embodiments of the present invention can be used to create an alloy/deposit chemistry that is not otherwise commercially available, or otherwise very expensive to manufacture. Thus, two different consumables can be used to obviate the need for an expensive or unavailable consumable. Further, embodiments can be used to create a diluted alloy. For example, a first welding wire could be a common, inexpensive alloy and a second welding wire could be a specialty wire. The resulting deposit would be the average of the two wires, mixed well in the formation of a molten droplet, at the lower average cost of the two wires versus an expensive specialty wire. Further, in some applications, the desired deposit could be unavailable due to the lack of appropriate consumable chemistry, but could be achieved by mixing two standard alloy wires, mixed within the molten droplet and deposited as a single droplet. Further, in some applications, such as the application of wear resistance metals, the desired deposit may be a combination of tungsten carbide particles from one wire and chrome carbide particles from another. Still in another application, a larger wire housing larger particles within is mixed with a smaller wire containing fewer particles or smaller particles, to deposit a mixture of the two wires. Here the expected contribution from each of the wires is proportional to the size of wire. Further, although exemplary embodiments are discussed herein utilizing two wire electrodes simultaneously, other embodiments of the present invention can utilize more than two electrodes. For example, it is contemplated that a three or more electrode configuration can be utilized consistent with the descriptions and discussions set forth herein.

Figure 1B:
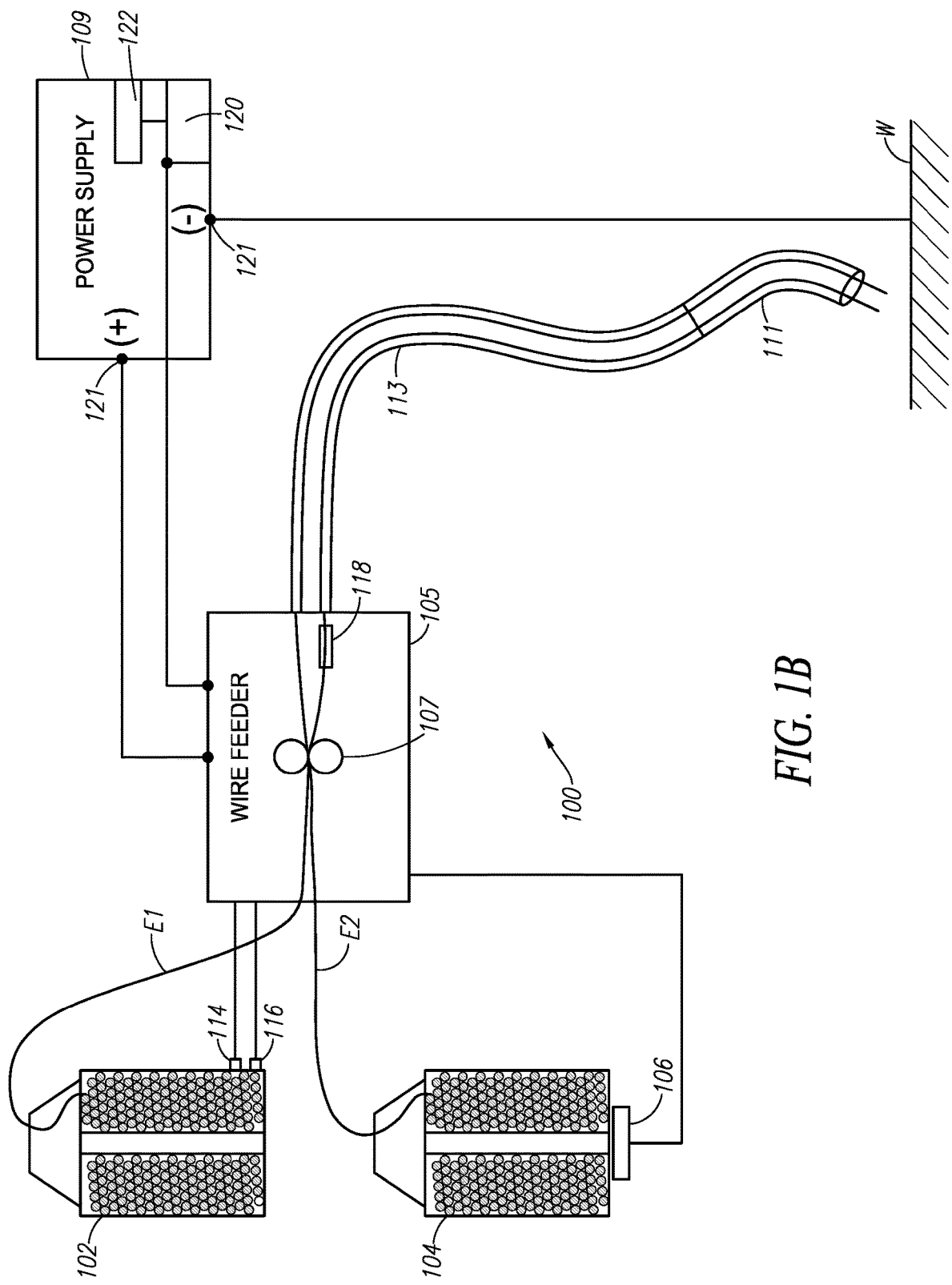
FIG. 1B is a schematic diagram of an example welding system.

FIG. 1B is similar to FIG. 1A. However, in FIG. 1B, the electrode sources 102, 104 are contained in drums rather than spools. The wire electrodes E1, E2 can be supplied from any conventional packaging system, such as spools, drums, boxes, reels, etc.

As shown in FIGS. 1A and 1B the system 100 can include sensor devices or sensors for tracking the amount of the wire electrodes E1, E2 remaining in their respective packages, tracking the amount of the wire electrodes consumed from the packages, and/or determining when one of the electrodes is about to be entirely consumed (e.g., indicating an impending wire run out condition). It is undesirable that one of the electrodes E1, E2 should be entirely consumed (e.g., its packaging system emptied of wire) during a deposition process, which could result in a portion of the deposition occurring using only a single wire electrode and possibly result in wire feeding problems (e.g., "bird-nesting"). By tracking the amount of the wire consumed or remaining at the sources, or otherwise signaling when an electrode is about to be entirely consumed, an operator can be informed of the need to replace one or both of the wire electrode sources before they run out.

The sensors monitor or determine a characteristic of the wire electrodes, such as a current weight, a height within a container, a position or location, a wire feed speed, etc. From one or more monitored characteristics of the wire, the consumed or remaining amount of the wire can be determined. In certain embodiment, the monitored characteristics can be received by the wire feeder 105 and/or power supply 109 and processed to determine the consumed or remaining amount of wire. The output from the sensors, alone or in combination with further processing by the wire feeder 105 and/or power supply 109, can result in the generation of signals or data corresponding to the consumed or remaining amount of one or both of the wire electrodes E1, E2.

One example sensor is a weight sensor 106 or scale that outputs the weight of an electrode source. From the weight, the wire feeder 105 or power supply 109 can determine the amount of electrode consumed from or remaining at the corresponding source. When the consumed or remaining amount of wire electrode reaches a threshold, the wire feeder 105 and/or power supply 109 can generate an alarm to instruct the operator to replace the electrode before it is fully consumed. The alarm can be displayed on a user interface at the wire feeder 105 or power supply 109, or transmitted to a remote device. Signals or data corresponding to the consumed or remaining amount of the electrodes E1, E2 can be communicated between the wire feeder 105 and power supply 109 over power cables or over a separate communications link 108.

Another example sensor is an ultrasonic level sensor 110 for determining a height or distance of a coil of welding electrode. An ultrasonic level sensor 110 is an example of a noncontact sensor. Various types of noncontact sensors could be used to determine how much electrode has been consumed or remains at the source, examples of which include magnetic or inductive sensors 112, 114, 116. Magnetic or inductive sensors could output a signal when the stored wire reaches a certain level. For example, when the coil of wire drops below the vertical level of the sensor, the sensor can be triggered and output a corresponding signal.

The amount of wire consumed can be tracked from the wire feed speed of the wire feeder 105. The wire feed speed or the linear amount of wire that has been fed can be measured by a linear wire feed sensor 118. The wire feed speed can also be determined by the wire feed speed setting used by the wire feeder. The amount of wire fed can be calculated from the wire feed speed and the feed time. In certain embodiments, the wire electrodes E1, E2 can be encoded with information that is read by the wire feeder 105, or read a separate reader device that communicates with the wire feeder and/or the power supply 109. The wire feeder 105 or reader can determine the amount of wire consumed or remaining from the encoded information. For example, the last 20-100 feet of wire can include encoded information that is used to determine that the wire is about to run out. Example encoding techniques include magnetically encoding information along the wire, or marking the wire with a code, such as by a laser.

Figure 2:
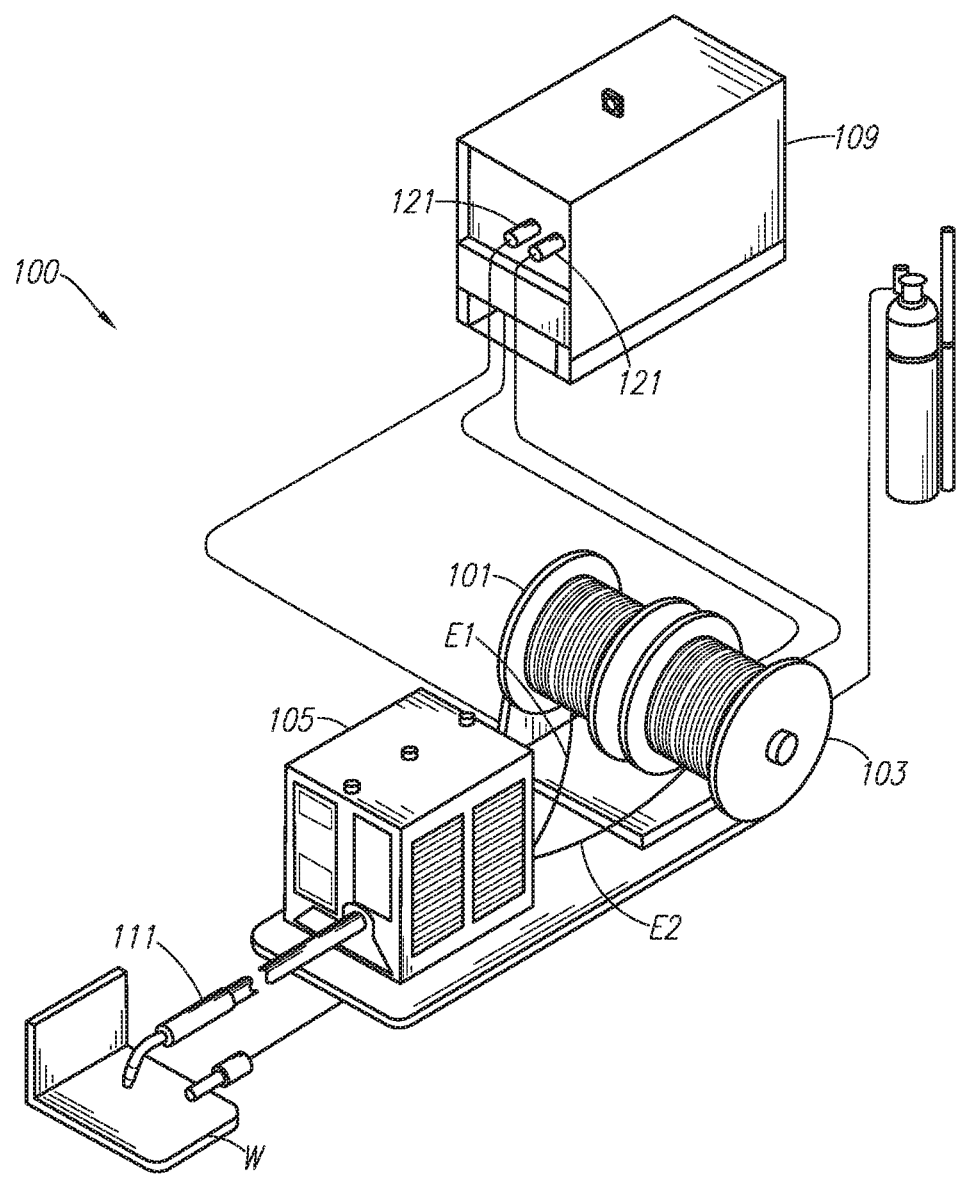
FIG. 2 is a perspective view of an example welding system.

FIG. 2 provides a perspective view of the welding system 100. The wire feeder 105 comprises drive rolls for conveying wire electrodes E1, E2 from electrode sources 101, 103, for use in a particular application. The wire electrodes E1, E2, may be drawn continuously from a reel, spool, or container (e.g., a box or a drum), and delivered to the workpiece W, which in the current embodiment is a weldment. The wire feeder 105 may include a drive assembly that utilizes power from one or more locomotive devices, such as an electric motor, that drive the wire electrodes E1, E2 to the application work site or workpiece W.

The welding power supply 109 may receive electrical input power from an outside source (e.g., utility power), that is directed to an onboard transformer and processor-controlled inverter or chopper circuitry, not depicted in the figures. Output from the power supply 109 may be provided through welding output terminals 121 or studs of the welding power supply. A welding gun or torch 111 and wire conduit may be electrically connected to the welding power supply 109 through the welding wire feeder 105 for delivering welding current to the workpiece W in a manner known in the art. It follows that the welding wires E1, E1 are fed through the torch 111 and metered out, i.e. dispensed, at the discretion of the application and/or end user in any manner suitable for conducting the welding process. It is noted that the electrodes E1, E1 conduct electricity for establishing a welding arc, wherein the electrodes are conveyed to the workpiece W having a voltage potential equal to or approximately equal to the output voltage of the welding power supply 109, which may be substantially greater than ground.

Different modes of conveying the wire electrodes E1, E2 are known in the art, an example of which includes pushing the electrodes to the torch 111 via power or torque provided by the locomotive device. Other modes of conveying the electrodes include push/pull modes that utilize multiple locomotive devices. The electrodes E1, E2 are delivered to the torch 111, which may have a trigger or other activation mechanism for dispensing the electrodes at the user's discretion. At times, it may be necessary to deliver the electrodes E1, E2 at varying rates of feed. Therefore, the locomotive device has an output that is adjustable for varying the wire feed speed (WFS) of the electrodes E1, E2. In particular, a drive motor of the wire feeder 105 may be a variable speed motor to adjust the WFS.

Figure 3:
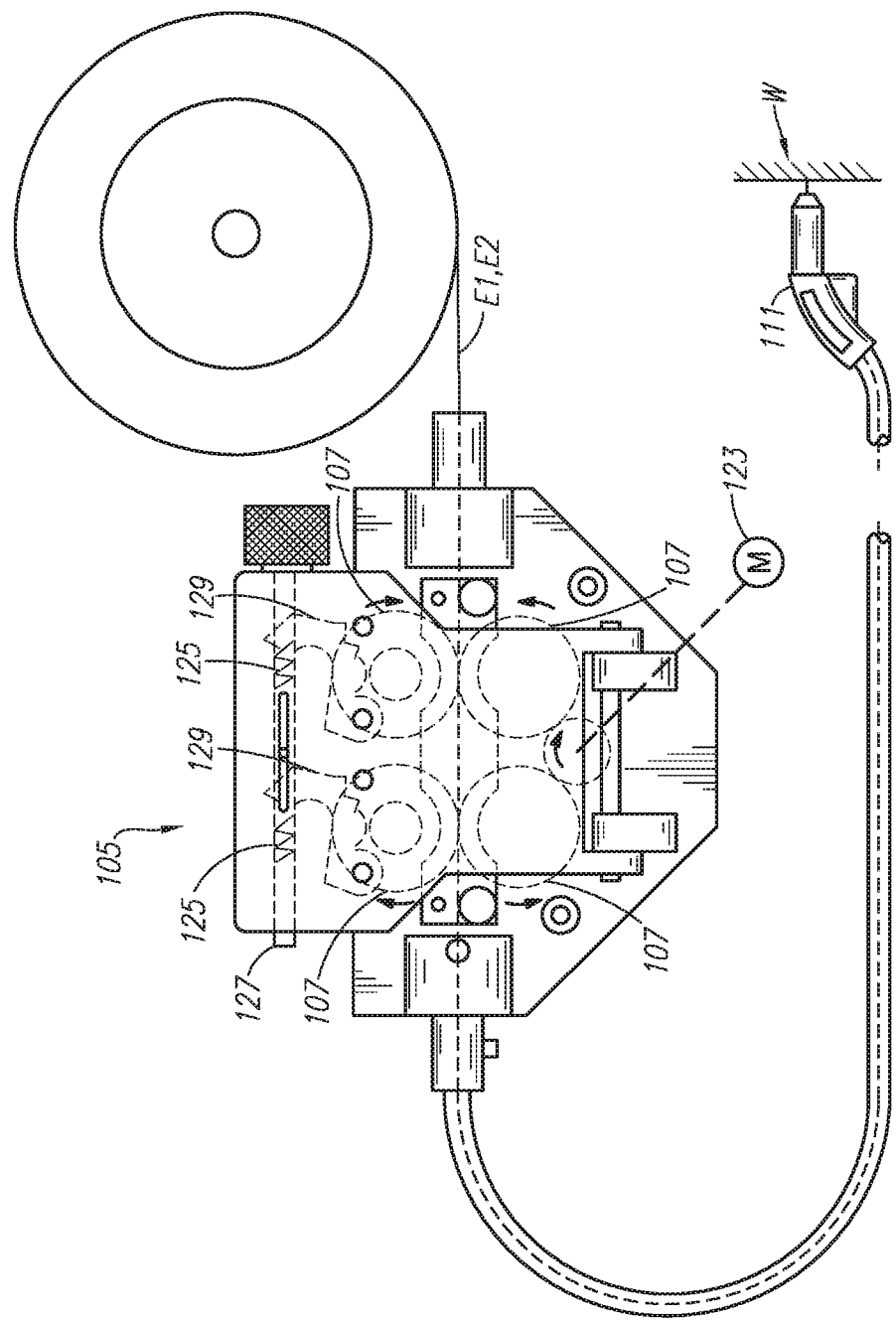
FIG. 3 is a side view of an example wire feeder.

A drive motor 123 is shown in FIG. 3. The wire feeder 105 and/or drive motor(s) 123 may draw operating power from the welding power supply 109, or an altogether separate power supply. Still any manner of providing power to operate the welding wire feeder 105 and/or the drive motors 123 may be chosen with sound engineering judgment as is appropriate for use with the embodiments of the present invention.

Referring to FIGS. 2 and 3, the welding wire feeder 105 may include a drive assembly, or drive roll assembly. As mentioned above, the drive motor 123, also called a wire feeder motor, delivers power, i.e. torque, to convey the first and second welding wires E1, E2 through the wire feeder and to the torch 111 and subsequently to the workpiece W. Drive rolls 107 are included that grip the welding wires E1, E2 for pushing or pulling the welding wires in the appropriate direction, i.e. toward the workpiece W. Sets of drive rolls 107 are vertically aligned and have corresponding aligned annular or circumferential grooves through which the wending wires E1, E2 pass simultaneously. It can be seen that the vertically-aligned sets of drive rolls 107 rotate in opposite directions to drive the welding wires E1, E2 through the wire feeder 105. For example, in FIG. 3, the upper drive rolls 107 rotate clockwise and the lower drive rolls rotate counterclockwise. The drive rolls 107 may be cylindrical in configuration, or more specifically disk-shaped, although the particular configuration should not be construed as limiting. The surface, i.e. the outer circumference, of the drive rolls 107 may be comprised of a sufficiently hardened material, like steel, that is durable and suitable for gripping the welding wires E1, E2. As shown, the drive rolls 107 may be disposed in pairs along the wire trajectory with each drive roll of the pair being supported on opposing sides of the welding wires E1, E2, such that respective outer circumferential portions of the rolls engage opposite sides of the wires (e.g., from above and below). It is noted that the central axes of respective drive rolls 107 extend substantially parallel with one another and generally transverse to the trajectory of the welding wires E1, E1.

The wire feeder 105 can include a biasing member that biases the vertically-aligned sets of drive rolls 107 toward one another. The biasing member sets the clamping force or compression that the drive rolls 107 apply to the welding wires E1, E2. For example, the wire feeder 105 can include biasing springs 125 that apply a bias force to one or more drive rolls 107 to set the compression that the drive rolls apply to the welding wires E1, E2. In the example embodiment of FIG. 3, the biasing springs 125 are mounted to an adjusting rod 127 that can be moved inward and outward to adjust the compression of the biasing springs 125. The force of the biasing springs 125 is transferred to the upper drive rolls 107 via pivoting levers 129. As noted above, the vertically-aligned sets of drive rolls 107 have corresponding aligned annular or circumferential grooves through which the wending wires E1, E2 pass simultaneously. That is, the welding wires E1, E2 are located together in the grooves of an upper drive roll and a lower drive roll. The welding wires E1, E2 are squeezed or compressed within the grooves by the bias force applied by the biasing springs 125 to the drive rolls 107. As will be explained further below, the welding wires E1, E2 are made to contact each other within the grooves when squeezed by the drive rolls 107. In addition to an upward/downward compressive force applied to the welding wires E1, E2, a sideways compressive force is also applied to the welding wires E1, E2 to force them together inside of the grooves. The sideways compressive force is provided through the shape of the sidewalls of the grooves.

Further details regarding the structure of welding wire feeders can be found in U.S. Pat. No. 5,816,466 issued on Oct. 6, 1998 and U.S. Pat. No. 8,569,653 issued on Oct. 29, 2013, both of which are incorporated herein by reference.

Figure 4:
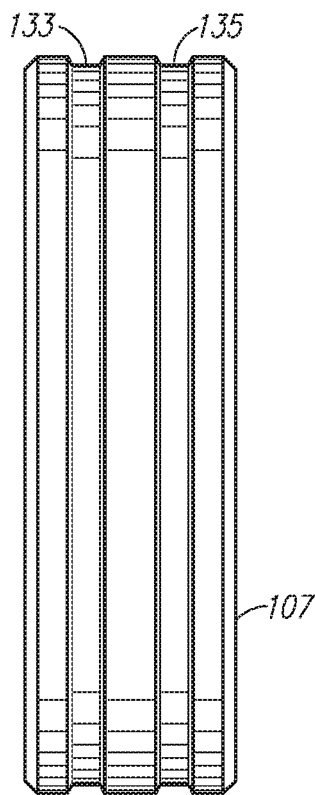
FIG. 4 illustrates an example drive roll.
Figure 5:
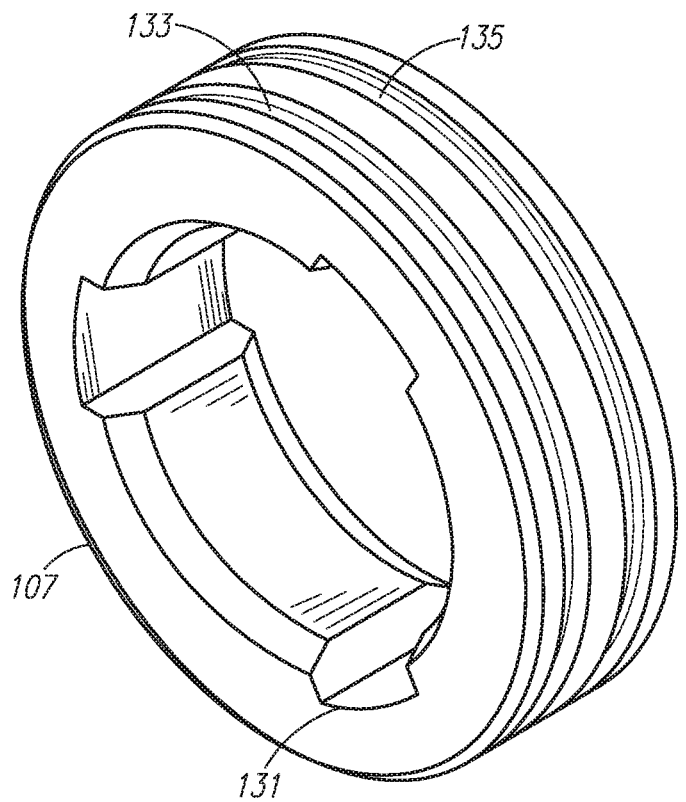
FIG. 5 is a perspective view of the example drive roll.

FIGS. 4 and 5 illustrate an example drive roll 107. The drive roll has a central bore. The inner surface of the bore can include contoured recesses 131 for receiving projections on a driving mechanism, such as a drive gear, to transfer drive torque to the drive roll 107. The drive roll 107 includes one or more annular or circumferential wire receiving grooves 133, 135. The wire receiving grooves 133, 135 are spaced axially along the circumference of the drive roll 107. The wire receiving grooves 133, 135 are designed to receive two welding wires. Example standard welding wire diameters for use with the drive rolls 107 include 0.030 inches, 0.035 inches, 0.040 inches, 0.045 inches, etc. The wire receiving grooves 133, 135 can have the same width and depth as each other, or have different widths and depths to accommodate different sizes or combinations of dual welding wires. If the wire receiving grooves 133, 135 each have the same width and depth, then the drive roll 107 can be reused when one groove is worn out by simply flipping the drive roll over and reinstalling it on the wire feeder. The wire receiving grooves 133, 135 can be configured to simultaneously drive two wires having the same diameter, or two wires having different diameters. In FIG. 4, the wire receiving grooves 133, 135 have a trapezoidal shape with straight, angled or inwardly-tapered sidewalls and a flat base extending between the sidewalls. However, the wire receiving grooves 133, 135 could have other shapes besides a trapezoidal shape, such as having a curved, concave groove base for example. In certain embodiments, the grooves 133, 135 can include knurling or other frictional surface treatments to help grip the welding wires.

Figure 6:
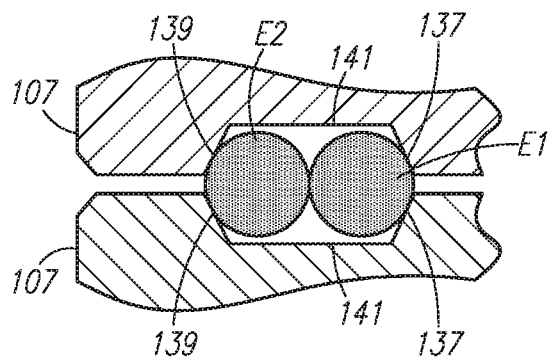
FIG. 6 illustrates a cross section of drives rolls feeding dual wires.

FIGS. 6 through 12 show partial cross sections of example drive rolls 107 as they would be mounted on a wire feeder for supplying dual wire electrodes. The drive rolls 107 are biased together to provide a clamping force on the first E1 and the second E2 welding wires. The welding wires E1, E2 are both located in the annular grooves of the upper and lower drive rolls 107. The annular grooves are aligned and can have a trapezoidal shape. In FIG. 6, the trapezoidal shape is an isosceles trapezoid formed by an inner sidewall 137, an outer sidewall 139, and a groove base 141 extending between the sidewalls. The isosceles trapezoidal shape is inverted as a cross-sectional recess from the outer circumferential surface of the drive rolls 107.

Due to the bias force applied to the drive rolls 107, the welding wires E1, E2 are clamped in the annular grooves between upper and lower sidewalls 137, 139 forming the grooves and the neighboring welding wire. The welding wires E1, E2 are stably held via three points of contact within the annular grooves. This clamping system can allow both wires to be fed through the wire feeder in a consistent manner. The two welding wires E1, E2 support each other during feeding and pull each other along via friction. Because the inner 137 and outer 139 sidewalls of the annular grooves are angled, they apply both vertical and horizontal clamping forces on the welding wires E1, E2. The horizontal clamping force pushes the welding wires E1, E2 together, causing them to contact each other. In certain embodiments, the welding wires E1, E2 are clamped within the annular grooves so as to be radially offset from both of the groove bases 141. That is, the welding wires E1, E2 are pinned between each other and the angled sidewalls 137, 139 of the grooves such that gaps exist between the welding wires and the groove bases 141. This can be seen clearly in FIG. 6.

Figure 7:
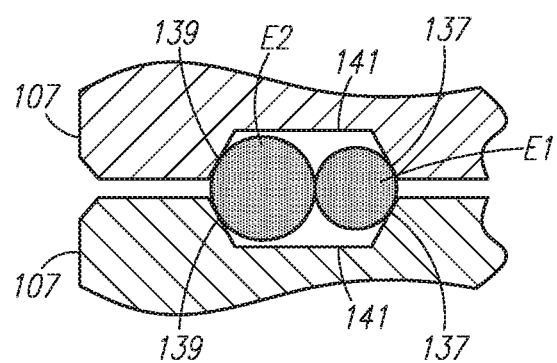
FIG. 7 illustrates a cross section of drives rolls feeding dual wires.

The clamping system discussed above allows for some variability (e.g., due to manufacturing tolerances) in the diameters of the welding wires E1, E2. If each welding wire E1, E2 had its own dedicated annular groove in the drive rolls 107, and one of the welding wires was slightly larger than the other, then the smaller welding wire might not be adequately clamped between the drive rolls. In such a situation, the larger welding wire would limit the radial displacement of the drive rolls 107 toward each other, thereby preventing proper clamping of the smaller wire. This could lead to feeding problems and so-called birdnesting of the smaller welding wire during feeding. The clamping system discussed above can accommodate wires of different sizes because the clamping system is self-adjusting. As can be seen in FIG. 7, when one welding wire E1 is larger than the other E2, the contact point between the wires is shifted axially from a central position within the annular grooves toward the smaller wire. Three points of contact are maintained on each welding wire E1, E2 by the sidewalls 137, 139 of the groove and the neighboring welding wire.

Figure 8:
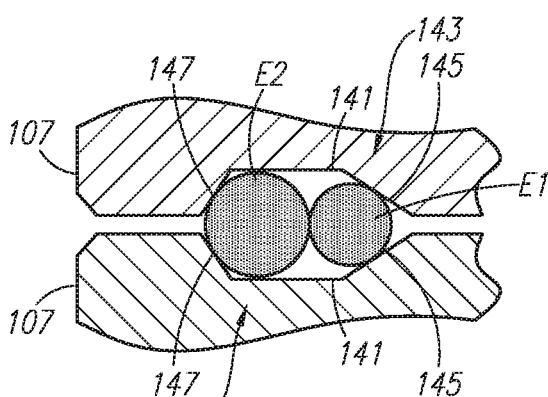
FIG. 8 illustrates a cross section of drives rolls feeding dual wires.
Figure 9:
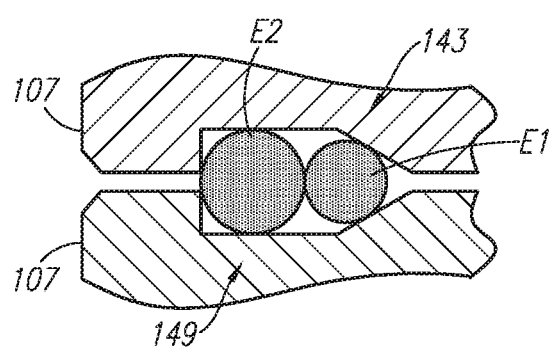
FIG. 9 illustrates a cross section of drives rolls feeding dual wires.
Figure 10:
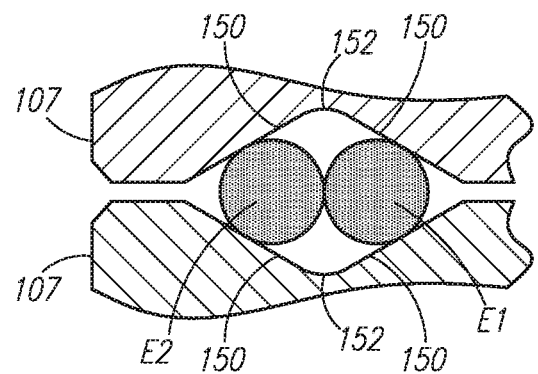
FIG. 10 illustrates a cross section of drives rolls feeding dual wires.

FIG. 8 shows drive rolls 107 having annular grooves 143 with cross sections having an acute trapezoid shape instead of an isosceles trapezoid. The inner 145 and outer 147 sidewalls of the grooves have different lengths and form different angles with the outer circumferential surface of the drive rolls. In FIG. 9, the drive rolls 107 have annular grooves 149 having a right trapezoid shape. Acute and right trapezoidal grooves can accommodate greater differences in welding wire diameters than isosceles trapezoids. Thus, acute and right trapezoidal grooves can be used when the groove is intended to drive welding wires having different diameters, such as a 0.040 inch welding wire with a 0.045 inch welding wire. In certain embodiments, the sidewalls and/or base of the grooves can be curved (e.g., concave or convex). Also, the inside corner transitions between the sidewalls and the base of the trapezoidal grooves can be curved or radiused. FIG. 10 shows example drive rolls having annular grooves with straight, angled sidewalls 150 joined by a concave curved or radiused groove base 152. In an example embodiment, the angle between the sidewalls 150 and the outer circumference of the drive roll 107 is about 150°, although other angles are possible and can be determined with sound engineering judgment.

Figure 11:
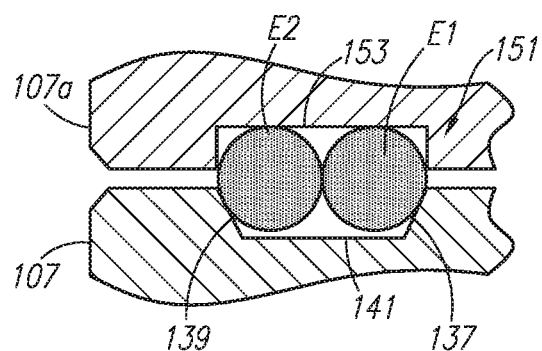
FIG. 11 illustrates a cross section of drives rolls feeding dual wires.

FIG. 11 shows an example embodiment in which one drive roll 107 has a trapezoidal groove for the welding wires E1, E2, and the other drive roll 107a has a non-trapezoidal groove. In FIG. 10, the non-trapezoidal groove is rectangular in shape, however other shapes are possible. For example, the non-trapezoidal groove could be curved, such as elliptical or rounded in shape. Further, the trapezoidal groove is shown as being located on the lower drive roll 107. However, the trapezoidal groove could be located on the upper drive roll 107a and the non-trapezoidal groove located on the lower drive roll. The welding wires E1, E2 are clamped between respective sidewalls 137, 139 of the trapezoidal groove and the base 153 of the non-trapezoidal groove 151, and the welding wires are forced into contact with each other as discussed above. Thus, the welding wires E1, E2 are stably held via three points of contact within the annular grooves 107, 107a.

Figure 12:
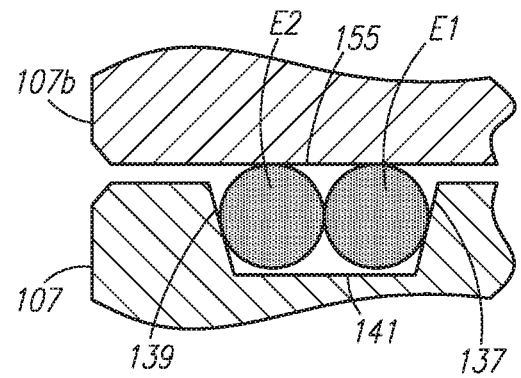
FIG. 12 illustrates a cross section of drives rolls feeding dual wires.

FIG. 12 shows an example embodiment in which one drive roll 107 has a trapezoidal groove for the welding wires E1, E2, and the other drive roll 107b has no groove, but rather directly contacts the welding wires on its outer circumferential surface 155. The trapezoidal groove is shown as being located on the lower drive roll 107. However, the trapezoidal groove could be located on the upper drive roll. The welding wires E1, E2 are clamped between respective sidewalls 137, 139 of the trapezoidal groove and the outer circumferential surface 155 of the upper drive roll 107b, and the welding wires are forced into contact with each other as discussed above. Thus, the welding wires E1, E2 are stably held via three points of contact.

Figure 13:
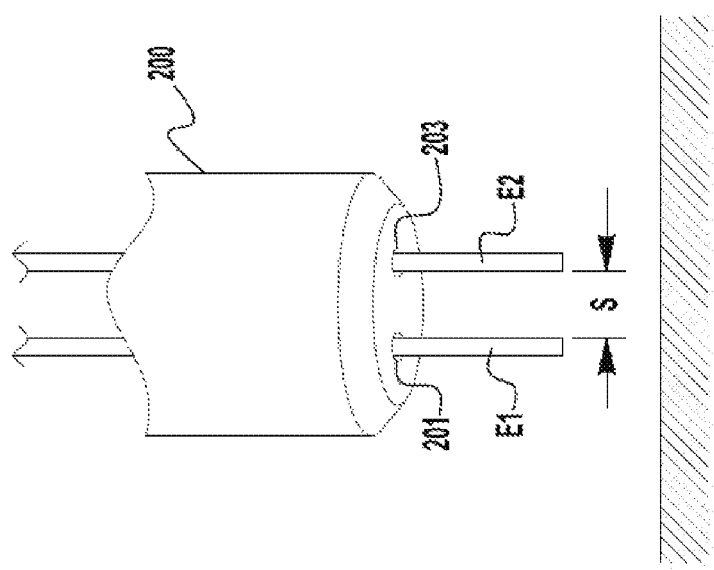
FIG. 13 illustrates an example contact tip assembly.

FIG. 13 depicts an exemplary contact tip assembly 200 of the present invention. The contact tip assembly 200 can be made from known contact tip materials and can be used in any known type of welding gun. As shown in this exemplary embodiment, the contact tip assembly has two separate channels 201 and 203 which run the length of the contact tip assembly 200. During welding a first electrode E1 is passed through the first channel 201 and the second electrode E2 is passed through the second channel 203. As noted above, although exemplary embodiments are discussed herein utilizing two wire electrodes simultaneously, other embodiments of the present invention can utilize more than two electrodes. For example, it is contemplated that a three or more electrode configuration can be utilized consistent with the descriptions and discussions set forth herein. Thus, the contact tip assembly 200 can include three or more channels for transferring current to three or more electrodes simultaneously. The channels 201/203 are typically sized appropriately for the diameter of wire that is to be passed there through. For example, if the electrodes are to have the same diameter the channels will have the same diameters. However, if different diameters are to be used then the channels should be sixed appropriately so as to properly transfer current to the electrodes. Additionally, in the embodiment shown, the channels 201/203 are configured such that the electrodes E1/E2 exit the distal end face of the contact tip 200 in a parallel relationship. However, in other exemplary embodiments the channels can be configured such that the electrodes E1/E2 exit the distal end face of the contact tip such that an angle in the range of +/−15° exists between the centerlines of the respective electrodes. The angling can be determined based on the desired performance characteristics of the welding, additive manufacturing, or other deposition operation to be performed. It is further noted that in some exemplary embodiments the contact tip assembly can be a single integrated contact tip with channels as shown, while in other embodiments the contact tip assembly can be comprised of two contact tip subassemblies located close to each other, where the current is directed to each of the contact tip subassemblies.

As shown in FIG. 13, the respective electrodes E1/E2 are spaced by a distance S which is the distance between the closest edges of the electrodes. In exemplary embodiments of the present invention, this distance is in the range of 0.025 to 4 times the diameter of the larger of the two electrodes E1/E2, while in other exemplary embodiments the distance S is in the range of 2 to 3 times the largest diameter. For example, if each of the electrodes has a diameter of 1 mm, the distance S can be in the range of 2 to 3 mm. In other exemplary embodiments, the distance S is in the range of 0.25 to 2.25 times the diameter of one of the wires, such as the larger of the two electrodes. In manual or semi-automatic welding operations the distance S can be in the range of 0.25 to 2.25 times the largest electrode diameter, whereas in robotic welding operations the distance S can be in the same or another range, such as 2.5 to 3.5 times the largest electrode diameter. In exemplary embodiments, the distance S is in the range of 1.5 to 3.5 mm.

As explained further below, the distance S should be selected to ensure that a single bridge droplet is formed between the electrodes, before the droplet is transferred, while preventing the electrodes from contacting each other, other than through the bridge droplet.

Figure 14A:
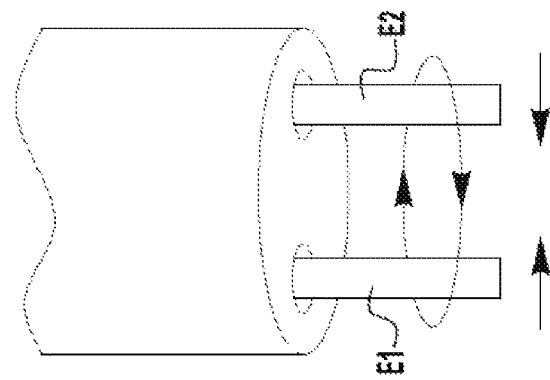
FIG. 14A illustrates a portion of an example deposition operation.

FIG. 14A depicts an exemplary embodiment of the present invention, while showing in the interactions of the magnetic forces from the respective electrodes E1 and E2. As shown, due to the flow of current, a magnetic field is generated around the electrodes which tends to create a pinch force that draws the wires towards each other. This magnetic force tends to create a droplet bridge between the two electrodes, which will be discussed in more detail below.

Figure 14C:
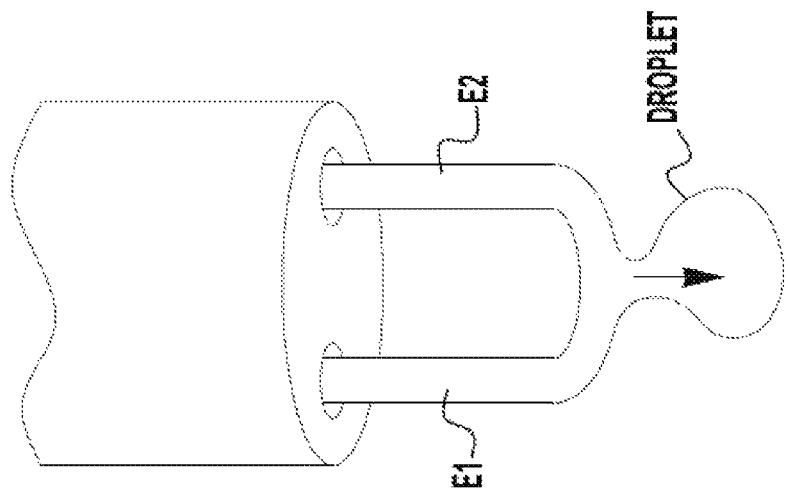
FIG. 14C illustrates a portion of an example deposition operation.
Figure 14B:
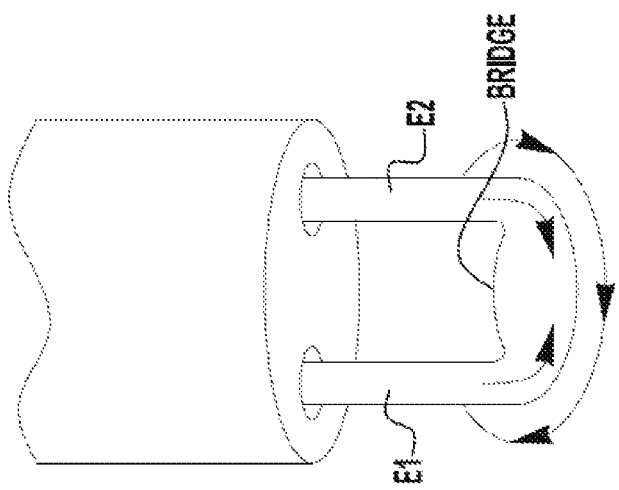
FIG. 14B illustrates a portion of an example deposition operation.

FIG. 14B shows the droplet bridge that is created between the two electrodes. That is, as the current passing through each of the electrodes melts the ends of the electrodes, the magnetic forces tend to draw the molten droplets towards each other until they connect with each other. The distance S is far enough such that the solid portions of the electrodes are not drawn to contact each other, but close enough that a droplet bridge is created before the molten droplet is transferred to the weld puddle created by the welding arc. The droplet is depicted in FIG. 14C where the droplet bridge creates a single large droplet that is transferred to the puddle during welding. As shown, the magnetic pinch force acting on the droplet bridge acts to pinch off the droplet similar to the use of a pinch force in a single electrode welding operation.

Figure 15B:
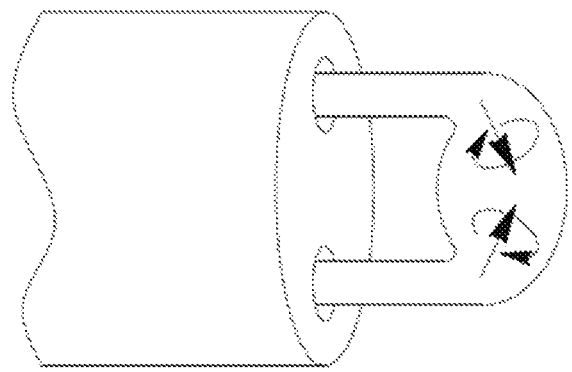
FIG. 15B illustrates an example current and magnetic field interaction.
Figure 15A:
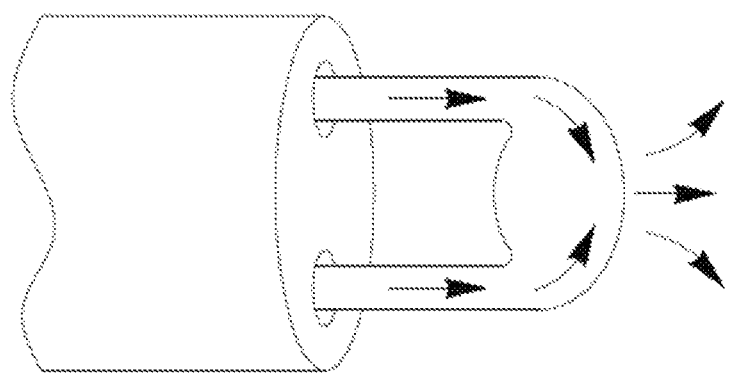
FIG. 15A illustrates an example current and magnetic field interaction.

Further, FIG. 15A depicts an exemplary representation of current flow in an embodiment of the present invention. As shown the welding current is divided so as to flow through each of the respective electrodes and passes to and through the bridge droplet as it is formed. The current then passes from the bridge droplet to the puddle and workpiece. In exemplary embodiments where the electrodes are of the same diameter and type the current will be essentially divided evenly through the electrodes. In embodiments where the electrodes have different resistance values, for example due to different diameters and/or compositions/construction, the respective currents will be apportioned due to the relationship of V=I*R, as the welding current is applied to the contact tip similar to known methodologies and the contact tip provides the welding current to the respective electrodes via the contact between the electrodes and the channel walls of the contact tip. FIG. 15B depicts the magnetic forces within the bridge puddle that aid in creating the bridge droplet. As shown, the magnetic forces tend to pull the respective molten portions of the electrodes towards each other until they contact with each other.

Figure 16A:
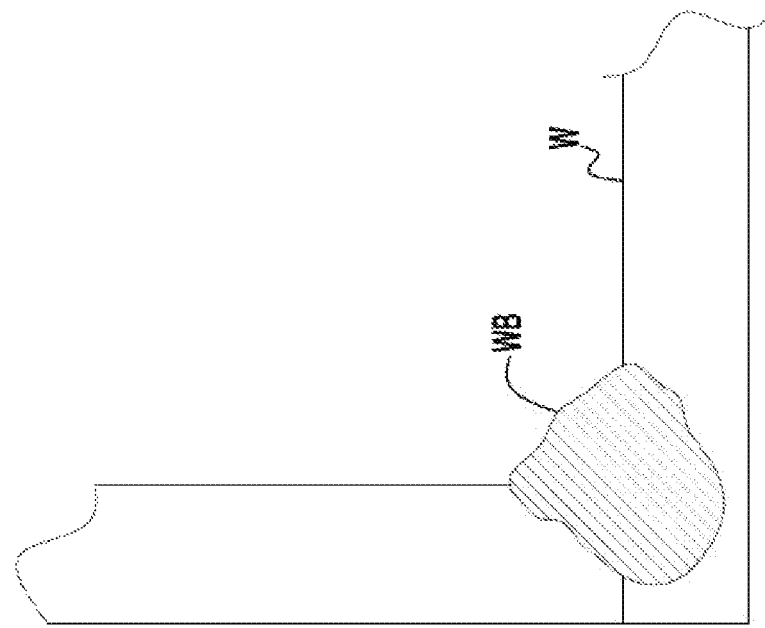
FIG. 16A illustrates a weld bead.
Figure 16B:
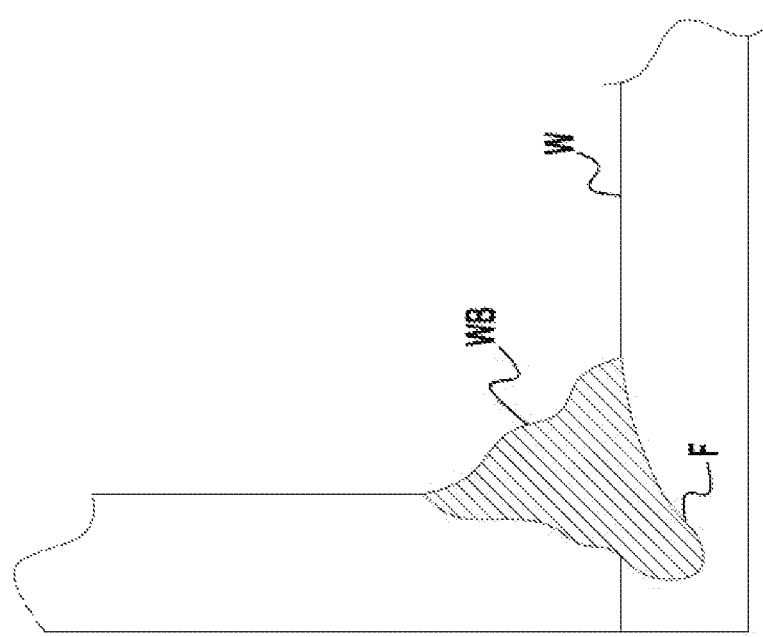
FIG. 16B illustrates a weld bead.

FIG. 16A depicts an exemplary cross-section of a weld made with a single electrode welding operation. As shown, while the weld bead WB is of an appropriate width, the finger F of the weld bead WB, which penetrates into the workpieces W as shown, has a relatively narrow width. This can occur in single wire welding operations when higher deposit rates are used. That is, in such welding operations the finger F can become so narrow that it is not reliable to assume that the finger penetrated in the desired direction, and thus cannot be a reliable indicator of proper weld penetration. Further, as this narrow finger dives deeper this can lead to defects such as porosity trapped near the finger. Additionally, in such welding operations the useful sides of the weld bead are not as deeply penetrated as desired. Thus, in certain applications this mechanical bond is not as strong as desired. Additionally, in some welding applications, such as when welding horizontal fillet welds, the use of a single electrode made it difficult to achieve equal sized weld legs, at high deposition speeds, without the addition of too much heat to the welding operation. These issues are alleviated with embodiments of the present invention which can reduce the penetration of the finger and spread the finger making the side penetration of the weld wider. An example of this is shown in FIG. 16B, which shows a weld bead of an embodiment of the present invention. As shown in this embodiment, a similar, or improved weld bead leg symmetry and/or length can be achieved, as well as a wider weld bead at the weld depth within the weld joint. This improved weld bead geometry is achieved while using less overall heat input into the weld. Therefore, embodiments of the present invention can provide improved mechanical weld performance with lower amounts of heat input, and at improved deposition rates. The use of two or more electrodes during a deposition operation can also improve the characteristics of the arc.

Figure 17:
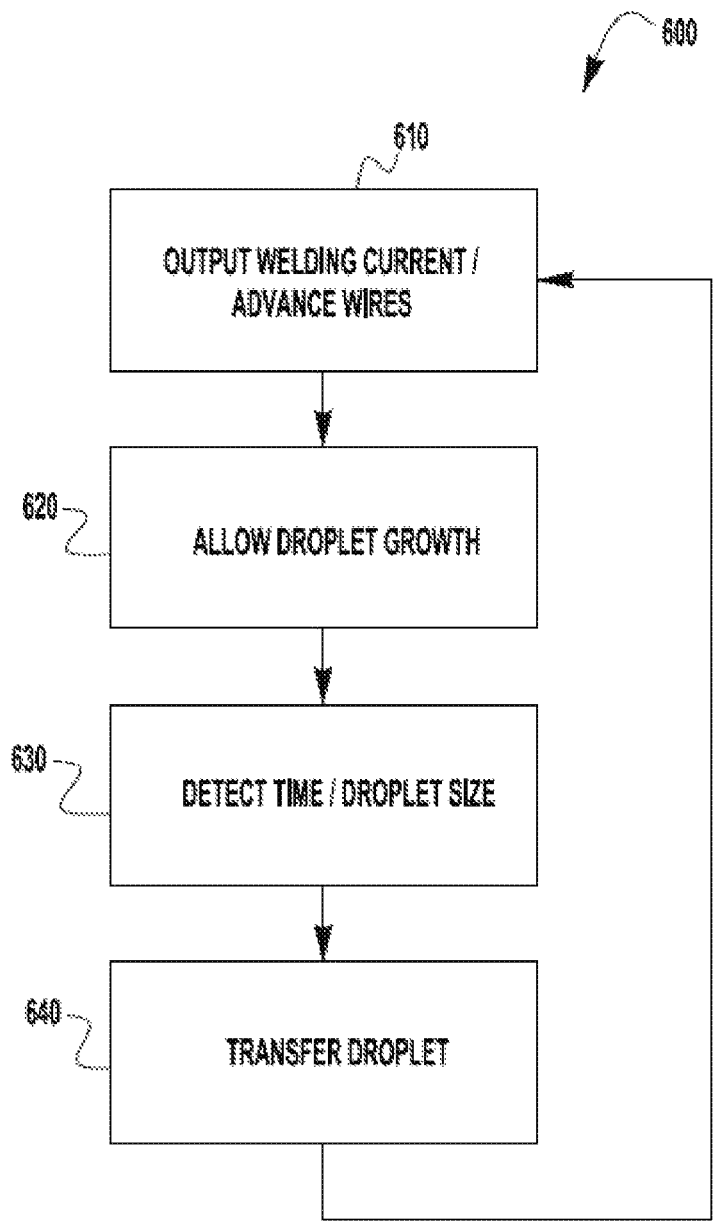
FIG. 17 is a flow diagram.

FIG. 17 depicts a flow chart 600 of an exemplary welding operation of the present invention. This flow chart is intended to be exemplary and is not intended to be limiting. As shown, a welding current/output is provided by the welding power supply 610 such that current is directed to the contact tip and electrodes consistent with known system constructions. Exemplary waveforms are discussed further below. During welding a bridge droplet is allowed to form 620 between the electrodes where the respective droplets from each electrode contact each other to create a bridge droplet. The bridge droplet is formed prior to contacting the weld puddle. During formation of the bridge droplet at least one of a duration or a droplet size is detected until such time as the droplet reaches a size to be transferred, and then the droplet is transferred to the molten puddle 640. The process is repeated during the welding operation. To control the welding process the power supply controller/control system can use either one of a bridge droplet current duration and/or a bridge droplet size detection to determine if the bridge droplet is of a size to be transferred. For example, in one embodiment a predetermined bridge current duration is used for a given welding operation such that a bridge current is maintained for that duration, after which droplet transfer is then initiated. In a further exemplary embodiment, the controller of the power supply can monitor the welding current and/or voltage and utilize a predetermined threshold (for example a voltage threshold) for a given welding operation. For example, in such embodiments, as the detected arc voltage (detected via a known type of arc voltage detection circuit) reaches a bridge droplet threshold level, the power supply initiates a droplet separation portion of the welding waveform. This will be discussed further below with respect to exemplary embodiments of welding waveforms that can be used with embodiments of the present invention.

Figure 18:
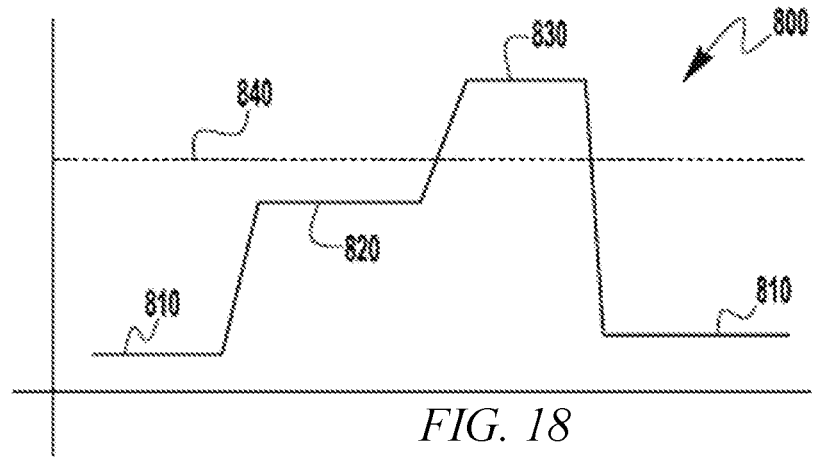
FIG. 18 illustrates an example weld current waveform.
Figure 19:
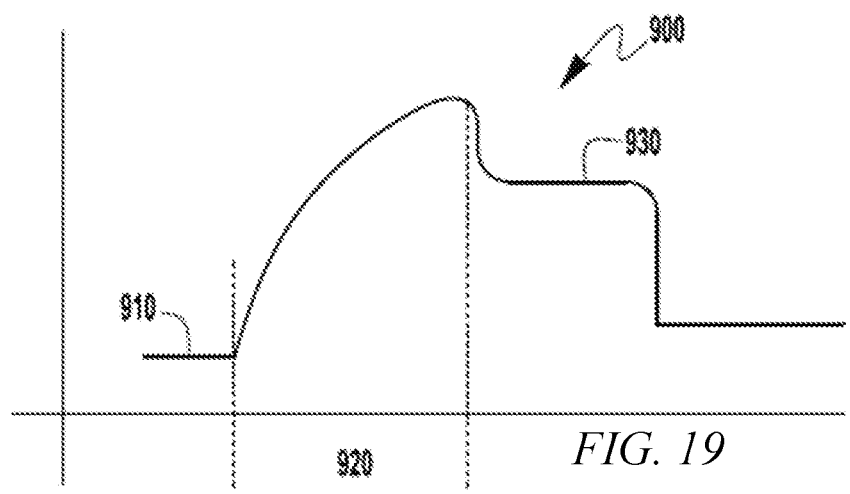
FIG. 19 illustrates an example weld current waveform.
Figure 20:
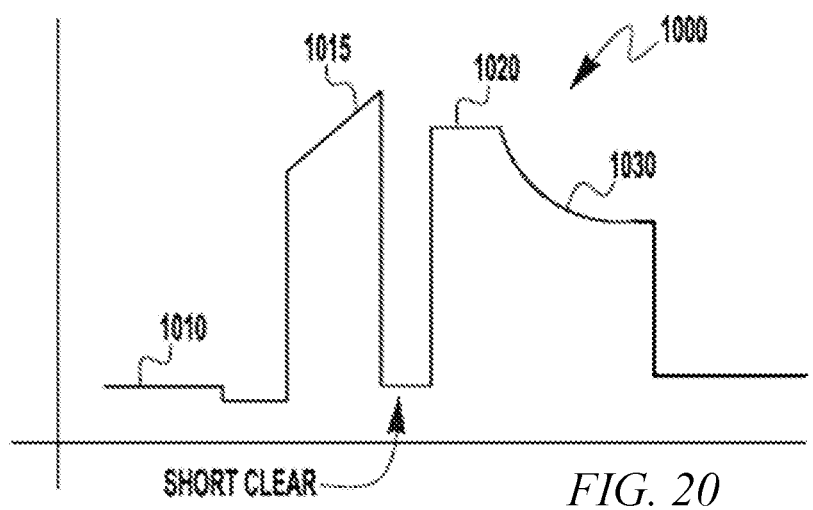
FIG. 20 illustrates an example weld current waveform.

Turning now to FIGS. 18 through 20, various exemplary waveforms that can be used with exemplary embodiments of the present invention are depicted. In general, in exemplary embodiments of the present invention, the current is increased to create the bridge droplet and build it for transfer. In exemplary embodiments, at transfer the bridge droplet has an average diameter which is similar to the distance S between the electrodes, which can be larger than the diameter of either of the electrodes. When the droplet is formed, it is transferred via a high peak current, after which the current drops to a lower (e.g. background) level to remove the arc pressure acting on the wires. The bridging current then builds a bridge droplet without exerting too much pinch force to pinch off the developing droplet. In exemplary embodiments, this bridging current is at a level in the range of 30 to 70% between the background current and the peak current. In other exemplary embodiments, the bridging current is in the range of 40 to 60% between the background current and the peak current. For example, if the background current is 100 amps and the peak current is 400 amps, the bridging current is in the range of 220 to 280 amps (i.e., 40 to 60% of the 300 amp difference). In some embodiments the bridging current can be maintained for a duration in the range of 1.5 to 8 ms, while in other exemplary embodiments the bridging current is maintained for a duration in the range of 2 to 6 ms. In exemplary embodiments the bridging current duration begins at the end of the background current state and includes a bridging current ramp up, where the ramp up can be in the range of 0.33 to 0.67 ms depending on the bridging current level and the ramp rate. With exemplary embodiments of the present invention, the pulse frequency of waveforms can be slowed down as compared to single wire processes to allow for droplet growth which can improve control and allow for higher deposition rates as compared to single wire operations.

FIG. 18 depicts an exemplary current waveform 800 for a pulsed spray welding type operation. As shown, the waveform 800 has a background current level 810, which then transitions to a bridge current level 820, during which the bridge droplet is grown to a size to be transferred. The bridge current level is less than a spray transition current level 840 at which the droplet starts its transfer to the puddle. At the conclusion of the bridge current 820 the current is raised to beyond the spray transition current level 840 to a peak current level 830. The peak current level is then maintained for a peak duration to allow for the transfer of the droplet to be completed. After transfer the current is then lowered to the background level again, as the process is repeated. Thus, in these embodiments the transfer of the single droplet does not occur during the bridge current portion of the waveform. In such exemplary embodiments, the lower current level for the bridge current 820 allows a droplet to form without excessive pinching force to direct the droplet to the puddle. Because of the use of the bridge droplet, welding operations can be attained where the peak current 830 can be maintained for a longer duration at a higher level than using a single wire. For example, some embodiments can maintain the peak duration for at least 4 ms, and in the range of 4 to 7 ms, at a peak current level in the range of 550 to 700 amps, and a background current in the range of 150 to 400 amps. In such embodiments, a significantly improved deposition rate can be achieved. For example, some embodiments have achieved deposition rates in the range of 19 to 26 lbs/hr, whereas similar single wire processes can only achieve a deposition rate in the range of 10 to 16 lbs/hr. For example, in one non-limiting embodiment a pair of twin wires having a diameter of 0.040", using a peak current of 700 amps, a background current of 180 amps and a droplet bridge current of 340 amps can be deposited at a rate of 19 lb/hr at a frequency of 120 Hz. Such a deposition is at a frequency much less than conventional welding processes, and thus more stable.

FIG. 19 depicts another exemplary waveform 900 that can be used in a short arc type welding operation. Again, the waveform 900 has a background portion 910 prior to a short response portion 920 which is structured to clear a short between the droplet and the puddle. During the shorting response 920 the current is raised to clear the short and as the short is cleared the current is dropped to a bridge current level 930 during which the bridge droplet is formed. Again, the bridge current level 930 is less than the peak current level of the shorting response 920. The bridge current level 930 is maintained for a bridge current duration that allows a bridge droplet to be formed and directed to the puddle. During transfer of the droplet current is then dropped to the background level, which allows the droplet to advance until a short occurs. When a short occurs the shorting response/bridge current waveform is repeated. It should be noted that in embodiments of the present invention it is the presence of the bridge droplet that makes the welding process more stable. That is, in traditional welding processes that use multiple wires, there is no bridge droplet. In those processes, when one wire shorts or makes contact with the puddle, the arc voltage drops and the arc for the other electrode will go out or extinguish. This does not occur with embodiments of the present invention, where the bridge droplet is common to each of the wires.

FIG. 20 depicts a further exemplary waveform 1000, which is a STT (surface tension transfer) type waveform. Because such waveforms are known, they will not be described in detail herein. To further explain an STT type waveform, its structure, use and implementation, US. Publication No. 2013/0264323, filed on Apr. 5, 2012, is incorporated herein in its entirety. Again, this waveform has a background level 1010, and a first peak level 1015 and a second peak level 1020, where the second peak level is reached after a short between the droplet and puddle is cleared. After the second peak current level 1020, the current is dropped to a bridge current level 1030 where the bridge droplet is formed, after which the current is dropped to the background level 1010 to allow the droplet to be advanced to the puddle, until it makes contact with the puddle. In other embodiments, an AC waveform can be used, for example an AC STT waveform, pulse waveform, etc. can be used.

The use of embodiments described herein can provide significant improvements in stability, weld structure and performance over known welding operations. However, in addition to welding operations, embodiments can be used in additive manufacturing operations. In fact, the system 100 described above can be used in additive manufacturing operations as in welding operations. In exemplary embodiments, improved deposition rates can be achieved in additive manufacturing operations. For example, when using an STT type waveform in a single wire additive manufacturing process, using a 0.045" wire can provide a deposition rate of about 5 lb/hr before becoming unstable. However, when using embodiments of the present invention and two 0.040" wires, a deposition rate of 7 lbs/hr can be achieved with a stable transfer. Because additive manufacturing processes and systems are known, the details of such processes and systems need not be described herein in detail. In such processes a bridging current, such as that descried above, can be used in the additive manufacturing current waveform.

It is noted that exemplary embodiments are not limited to the usage of the waveforms discussed above and described herein, as other welding type waveforms can be used with embodiments of the present invention. For example, other embodiments can use variable polarity pulsed spray welding waveforms, AC waveforms, etc. without departing from the spirit and scope of the present invention. For example, in variable polarity embodiments the bridge portion of the welding waveform can be done in a negative polarity such that the bridge droplet is created while reducing the overall heat input into the weld puddle. For example, when using AC type waveforms, the waveforms can have a frequency of 60 to 200 Hz of alternating negative and positive pulses to melt the two wires and form the bridge droplet between them. In further embodiments, the frequency can be in the range of 80 to 120 Hz.

As explained previously, embodiments of the present invention can be used with different types and combinations of consumables including flux cored consumables. In fact, embodiments of the present invention can provide a more stable welding operation when using flux cored electrodes. Specifically, the use of a bridging droplet can aid in stabilizing flux core droplets that can tend to be unstable in a single wire welding operation. Further, embodiments of the present invention allow for increased weld and arc stability at higher deposition rates. For example, in single wire welding operations, at high current and high deposition rates, the transfer type for the droplets can change from a streaming spray to a rotational spray, which appreciably reduces the stability of the welding operation. However, with exemplary embodiments of the present invention, the bridge droplet stabilizes the droplets which significantly improves arc and weld stability at high deposition rates, such as those above 20 lb/hr.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A welding or additive manufacturing system, comprising:
   a wire feeder including a first drive roll, a second drive roll, and a biasing member that biases the first drive roll toward the second drive roll or the second drive roll toward the first drive roll, wherein the first drive roll has a circumferential groove for simultaneously driving both of a first wire electrode and a second wire electrode, located between the first drive roll and the second drive roll, such that both of the first wire electrode and the second wire electrode are located together in a single circumferential groove of the first drive roll;
   a welding torch including a contact tip having a first exit orifice for the first wire electrode and a second exit orifice for the second wire electrode, wherein the first and second exit orifices are separated from each other such that a distance S is provided between the first wire electrode and the second wire electrode, and the distance S is configured to facilitate formation of a bridge droplet between the first wire electrode and the second wire electrode while preventing solid portions of the first wire electrode delivered through the first exit orifice from contacting solid portions of the second wire electrode delivered through the second exit orifice during a deposition operation, where said bridge droplet couples the first wire electrode and the second wire electrode prior to contacting a molten puddle during the deposition operation; and
   a sensor device that generates a signal or data corresponding to a consumed or remaining amount of one or both of the first wire electrode and the second wire electrode,
   wherein the first drive roll has two circumferential grooves that are spaced axially along a circumference of the first drive roll.

2. The welding or additive manufacturing system of claim 1, wherein both of the first wire electrode and the second wire electrode are offset from a concave base portion of the circumferential groove that extends between sidewall portions of the circumferential groove.

3. The welding or additive manufacturing system of claim 1, wherein the distance S is in the range of 1.5 to 3.5 mm as measured between closest edges of the first wire electrode and the second wire electrode.

4. The welding or additive manufacturing system of claim 1, wherein the distance S is in the range of 2 to 3 mm as measured between closest edges of the first wire electrode and the second wire electrode.

5. The welding or additive manufacturing system of claim 1, wherein the distance S is in the range of 0.25 to 2.25 times the largest diameter of either of the first wire electrode and the second wire electrode, as measured between closest edges of the first wire electrode and the second wire electrode.

6. The welding or additive manufacturing system of claim 1, wherein the distance S is in the range of 2.5 to 3.5 times the largest diameter of either of the first wire electrode and the second wire electrode, as measured between closest edges of the first wire electrode and the second wire electrode.

* * * * *